June 1, 1971  C. R. AVERY ET AL  3,582,310
MOLTEN GLASS FOREHEARTH CONSTRUCTION
Filed Nov. 4, 1968  5 Sheets-Sheet 5
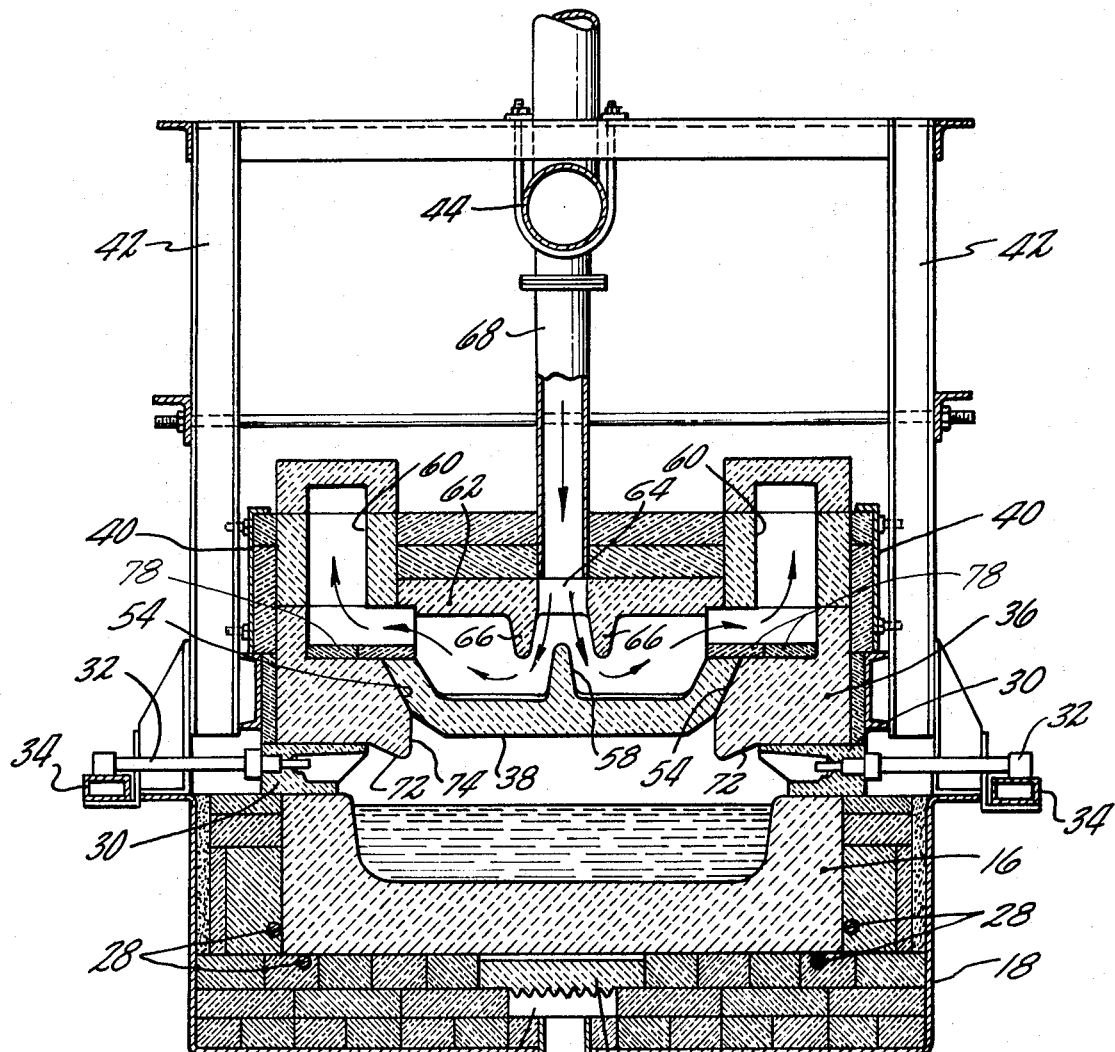
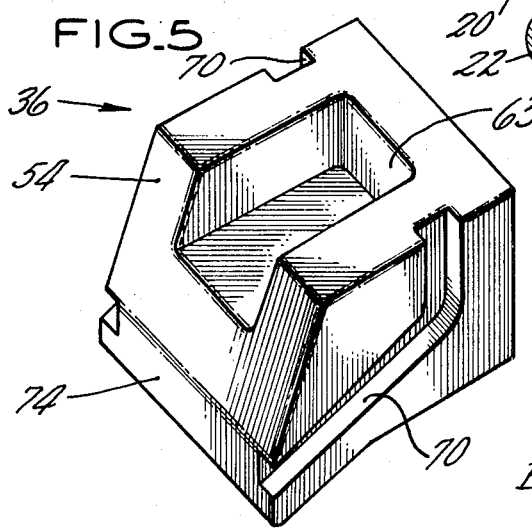
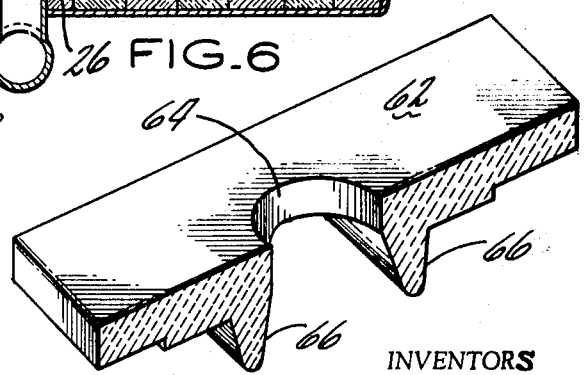
INVENTORS
CHARLES R. AVERY
JOHN H. CALL
BY McCormick, Paulding & Huber
ATTORNEYS FIG_4
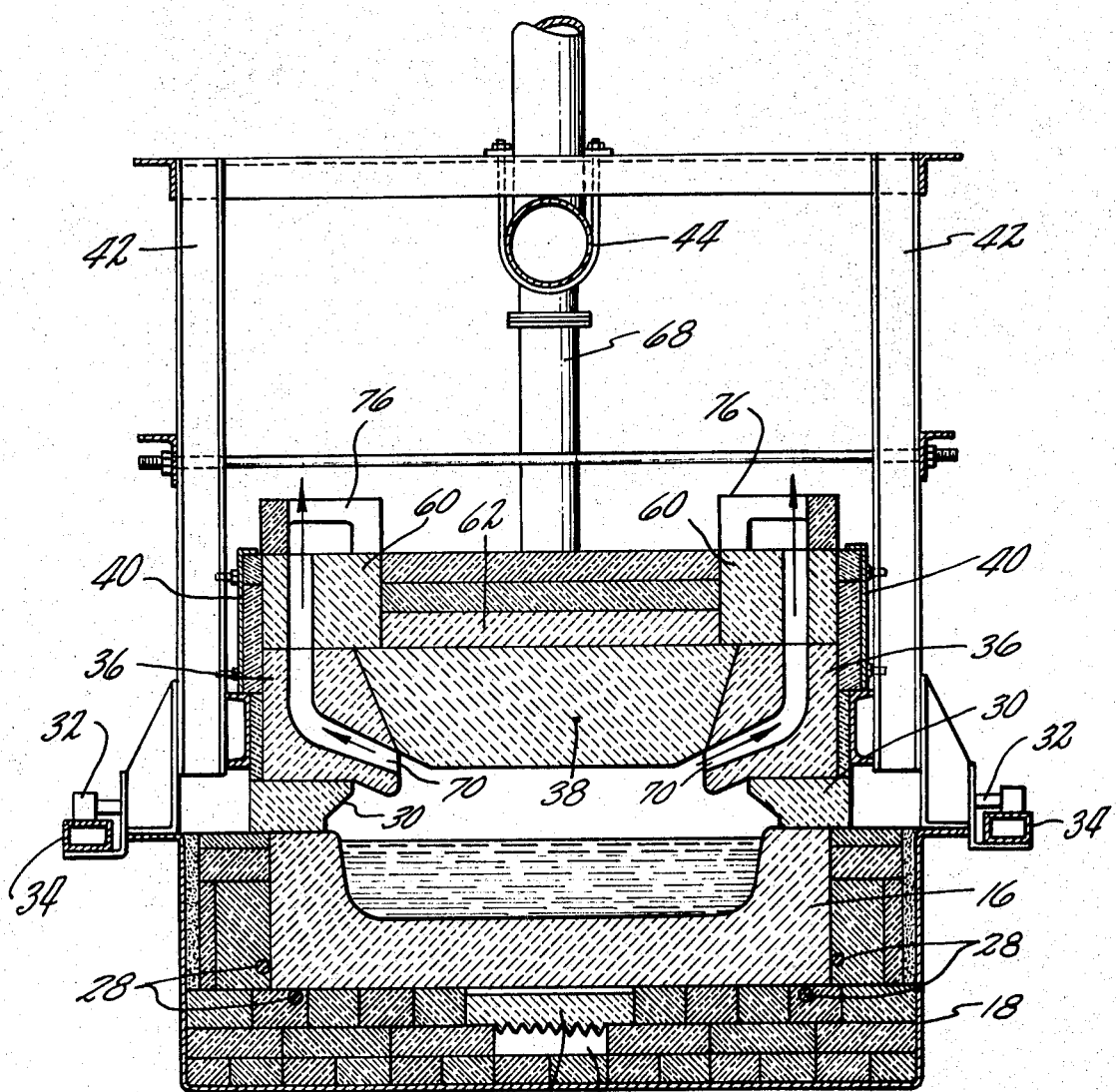
FIG_7
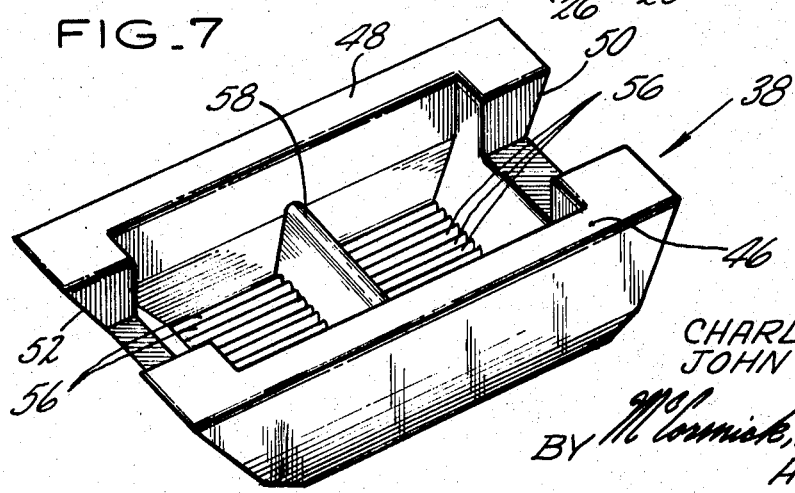
INVENTORS
CHARLES R. AVERY
JOHN H. CALL
BY McCormick, Paulding & Huber
ATTORNEYS United States Patent Office 3,582,310
Patented June 1, 1971

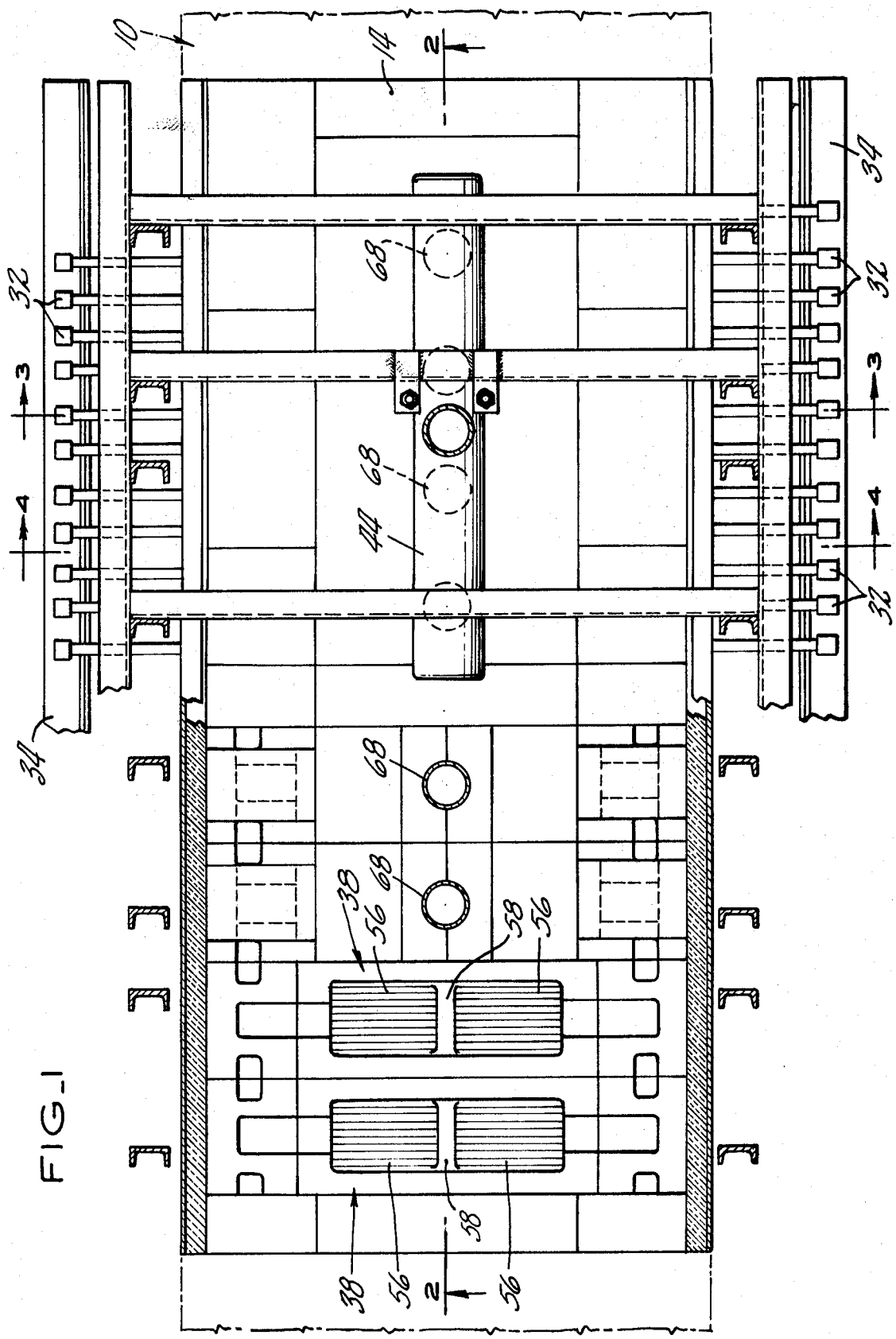

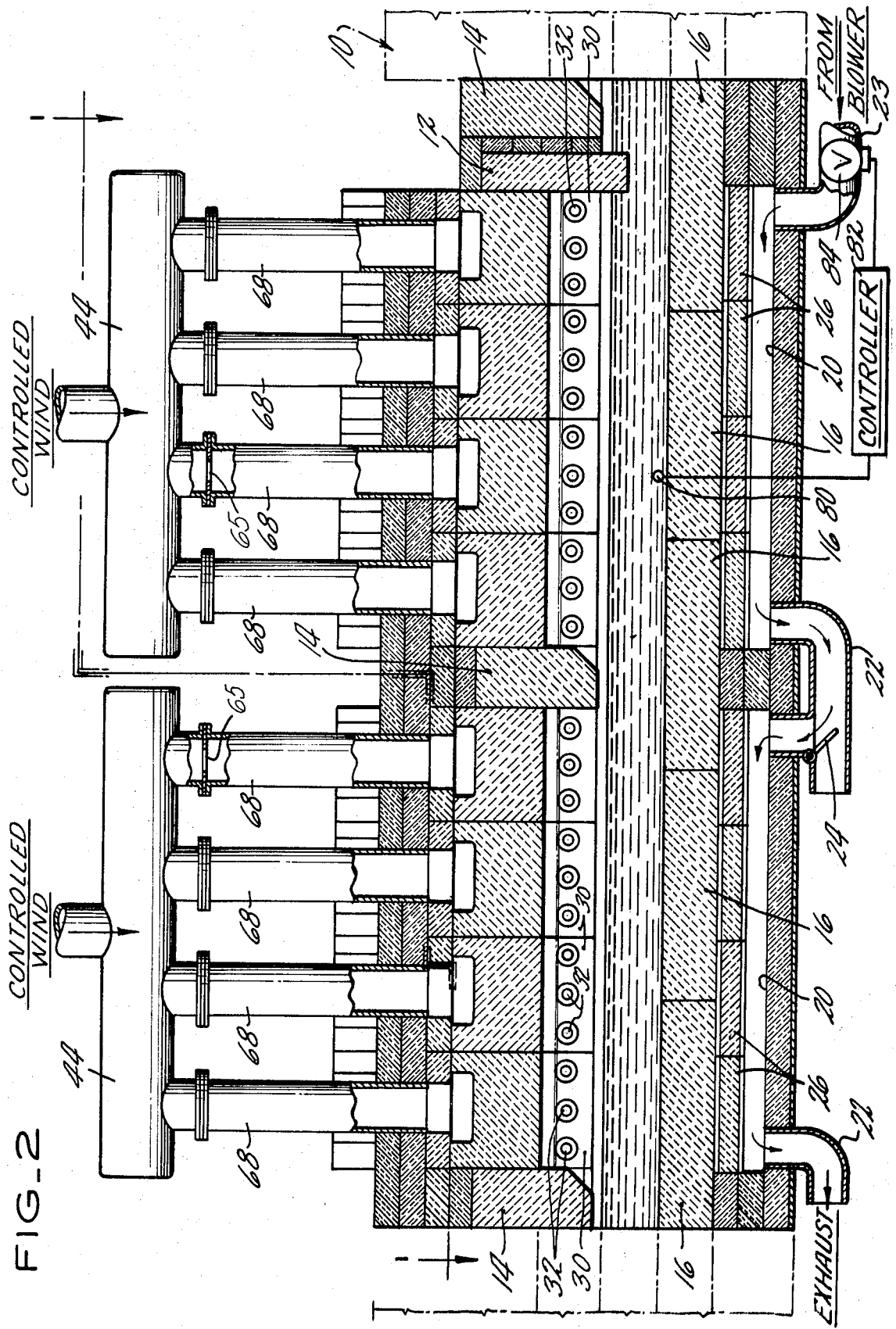

3,582,310
MOLTEN GLASS FOREHEARTH CONSTRUCTION
Charles R. Avery, Chester, and John H. Call, Tariffville, Conn., assignors to Emhart Corporation, Bloomfield, Conn.
Filed Nov. 4, 1968, Ser. No. 773,024
Int. Cl. C03b 5/16
U.S. Cl. 65—346          7 Claims

ABSTRACT OF THE DISCLOSURE

The forehearth has a channel through which molten glass flows toward a feeder bowl located at the downstream end thereof. The channel structure is cooled along its central portion by air circulated through a longitudinally extending passageway defined along the center line of the channel structure. A plurality of burners fire laterally into the space above the molten glass in the channel, and a roof structure defines flues for carrying off the exhaust gasses. The roof structure has internally cooled arch or keystone blocks which define individual chambers through which cooling air can be circulated independently of the exhaust gas flues to cool the center portion of the roof structure, and consequently reduce transverse temperature gradients in the forehearth.

SUMMARY OF THE INVENTION

This invention relates to molten glass forehearth constructions, and deals more particularly with a forehearth so constructed as to minimize transverse and vertical temperature gradients in the glass flowing through the forehearth.

In a molten glass forehearth glass commonly flows through a refractory channel, which is insulated on the sides and bottom, to a feeder bowl located at the downstream end thereof. At relatively low rates of glass flow or "pull," heat is generally applied by means of burners in the side walls of the forehearth in an attempt to maintain the molten glass at the desired temperature for delivery to the feeder bowl. At higher glass flow rates small quantities of heat can be selectively applied, heat removal being necessary for the increased "pulls" encountered in present day forehearths. By selective heat removal and application in the forehearth, an attempt has been made to reduce the average temperature at a constant rate to the desired delivery temperature at the bowl of feeder spout, in spite of variations in the quantity of glass flowing therethrough. Heat losses from the molten glass to the bottom and sides of the channel by conduction, usually result in the creation of transverse and vertical temperature gradients in the glass. That is, the glass adjacent to the bottom and sides of the channel becomes somewhat cooler than the glass in the center of the channel with the result that it flows more slowly further increasing its tendency to lose heat. In order to alleviate this problem, forehearths have been constructed with provision for introducing cooling wind into the space above the glass. Various designs have been proposed seeking to use the products of combustion from the burners to heat the glass at the sides of the channel, while the cooling wind is so introduced so as to effect only the glass in the central portion of the channel. Actually, it has been found that the products of combustion mix with the cooling air to a considerable degree thus cooling the combustion gasses, and conversely heating the cooling air, with the result that the attainment of the foregoing object has not been possible.

One object of the present invention then is to reduce the transverse temperature gradients in the glass flowing through forehearth by so introducing the top cooling air as to cool only the refractory arch above the central portion of the glass in the channel without permitting this cooling air to mix with the products of combustion produced by the burners.

Another object of the present invention is to reduce the vertical temperature gradients in the glass, especially at vertical temperature gradients in the glass, especially at high flow rates, by introducing bottom cooling air in the central portion of the channel so that the molten glass in the center of the channel is not only cooled from above, but is also cooled from below to reduce vertical temperature gradients therein.

Another object of the present invention is to provide a forehearth construction wherein the central arch portion of the roof structure is internally cooled by fluid circulated laterally through the roof, and wherein the channel structure is also internally cooled by fluid circulated longitudinally through the channel structure to permit independent controlling of the glass temperature in the top and bottom layers respectively. This feature is particularly important in double and triple gob installations wherein variations of the individual gobs weights has been encountered because of vertical temperature gradients in the glass delivered to the feeder bowl.

BRIEF DESCRIPTION OF THE DRAWINGS

FIG. 1 is a plan view, partly in section of a forehearth constructed in accordance with the present invention being taken along the line 1—1 of FIG. 2.

FIG. 2 is a vertical sectional view of the forehearth shown in FIG. 1, being taken along the line 2—2 of that view.

FIG. 3 is a transverse cross-sectional view, being taken along the line 3—3 of FIG. 1.

FIG. 4 is a transverse cross-sectional view, being taken on the line 4—4 of FIG. 1.

FIG. 5 is a perspective view of a single refractory block of the type comprising the side portions of the roof structure of the forehearth.

FIG. 6 is a perspective view of a portion of one of the refractory caps utilized in the roof structure of the forehearth.

FIG. 7 is a perspective view of one of the refractory arch blocks utilized in the roof structure of the forehearth.

DETAILED DESCRIPTION

Figure 8:
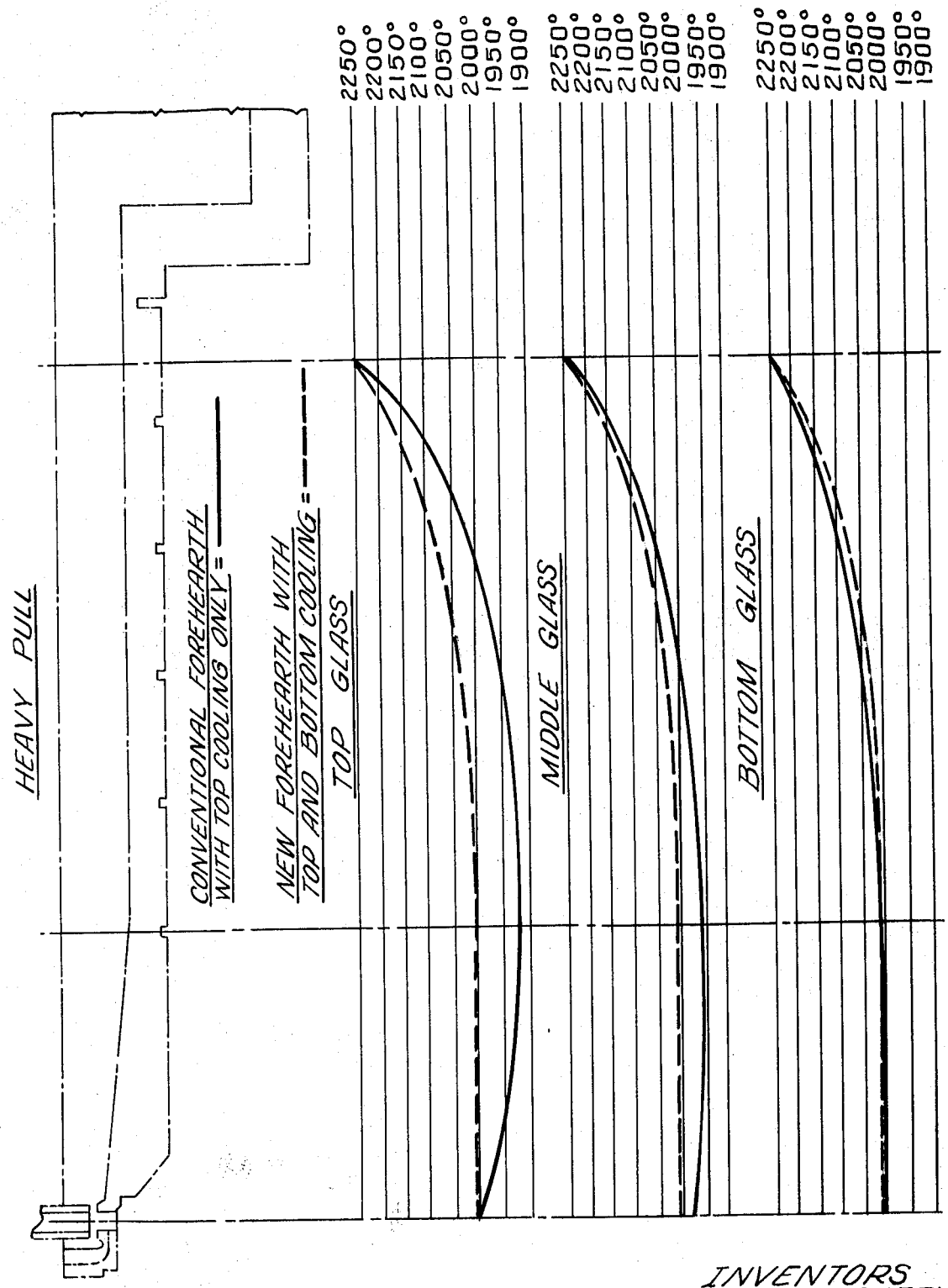
FIG. 8 is a comparison between a typical non-bottom cooled forehearth and a forehearth of the present invention showing typical longitudinal temperature variations of the top, middle, and bottom layers of glass for a relatively high rate of glass flow.

Turning now to the drawings in greater detail, FIGS. 1 and 2 show a pair of generally similar forehearth sections, or zones, arranged in end toward end relationship, and adapted to receive molten glass at the right hand, or upstream end, and to carry such glass toward the left for discharge at the left hand, or downstream end. It will be apparent that one or more such sections, or zones, might be utilized in a particular forehearth installation, and that additional cooling sections might be utilized upstream or downstream of those shown in these figures. As best shown in FIG. 2, the upstream end of the forehearth communicates with a refiner tank 10, and is provided with a skimmer block 12 for isolating the forehearth atmosphere from the refiner tank atmosphere to keep the excess heat and pressure in the tank from creating undesirable temperature variations in the forehearth. Baffles are provided at the upstream and downstream ends of each of the forehearth sections, as indicated generally at 14, 14, to provide separate combustion zones which can be separately heated by burners (to be described).

The channel defining structure of the forehearth comprises a plurality of channel refractory blocks 16, 16, of conventional construction joined end toward end so as to provide a passageway through which the molten glass can flow. As best shown in FIGS. 3 and 4, the lower or base portion of the channel structure is preferably built up from suitable blocks of insulating material, which blocks are held in place by a suitable metal shell 18. In accordance with the present invention, these insulating blocks define a longitudinally extending passageway 20 through which cooling air can be directed, as best shown in FIG. 2, from a blower (not shown). A longitudinally extending passageway 20 is separately defined in each of the zones or sections of the forehearth, with provision being made for circulating cooling air from a passageway 20 in the upstream zone to the passageway in the adjacent downstream zone by duct work, indicated generally at 22. A damper valve 24 can be set to admit predetermined portions of the cooling air from the rear zone to the front zone. Fresh cooling air could also be introduced at this point if desired. Preferably, the individual block 26 defining the upper surface of these longitudinally extending passageways, 20, 20 has a lower surface which defines longitudinally extending ribs for achieving optimum heat transfer between the cooling fluid and the forehearth channel structure. It will be apparent that the longitudinally extending passageways, 20, 20 in the channel structure of the forehearth tend to reduce the temperature along the central portion of the channel blocks 16, 16 and tend to lower the temperature of the molten glass immediately thereabove so as to reduce the transverse temperature gradients across the channel and the vertical gradients encountered at high flow rates.

As shown in FIG. 8, molten glass usually enters the upstream end of the forehearth at about 2250° F. in the case of amber colored glass. At high flow rates in a conventional forehearth, the glass must be cooled from above its top surface to about 1920° F. in order to reduce the tempertaure of the bottom glass to about 2020° F. as it leaves the forehearth. Thus, the vertical temperature gradient is about 100° F. In a forehearth with provision for bottom cooling as described above, the top layers need only be cooled to about 2000° F., since the bottom layer is independently cooled to about 2020° F. Thus, the vertical temperature gradient, 20° F., in a bottom cooled forehearth operated at the same "pull" or glass flow rate is only one fifth that of the same forehearth without bottom cooling.

In summary then, it will be apparent that independently controlled top and bottom cooling for the forehearth tends to produce a more homogeneous mass of glass at the downstream end of the channel, especially at the high "pull" rates associated with present day feeder bowl requirements. This independent control feature has a further advantage which will now be described.

Characteristically, melting furnaces or tanks do not provide glass at precisely 2250° F. at the upstream end of the forehearth. That is, transient vertical temperature gradients are likely to be encountered at this juncture. These variations are particularly detrimental to the operation of double or triple gob feeding mechanisms and require that running adjustments be made in the feeding system of the glass gobs to take care of resulting viscosity changes. In order to alleviate the effects to such changes on the formation of double and triple gobs of glass, the forehearth shown is provided with automatic temperature control for regulating the bottom cooling independently of the cooling of the glass surface. Controls for the latter have been used heretofore, but it has been found that they cannot cope with the phenomena of transient vertical temperature gradients. As shown in FIG. 2 a thermo couple 80 is mounted adjacent the floor of the channel to sense the temperature of the bottom layer of glass therein. A conventional temperature controller 82 regulates a control valve 84 in response to variations in this temperature to preserve a desired glass temperature. The top layer of glass is also regulated by a similar control system in conjunction with the plenum chambers 44, 44 to be described, but the significant advantage here lies in the independent regulation of temperature in the top and the bottom layers of glass in the forehearth.

As a result of the selective, or independent cooling for both the bottom and top layers of glass in this forehearth, no excessive surface cooling is required at high flow rates and with colored glass, and therefore, the severe vertical temperature gradients previously encountered are effectively avoided. The present forehearth results in a more efficient apparatus capable of delivering a thermally homogeneous mass of glass. For a forehearth of given length, higher tonnages can be delivered with less fuel consumed by the burners, to be described. As a result of the more stable conditions at all tonnages, or glass flow rates, the forehearth lends itself to complete automation, a plus not possible heretofore precisely because of the severe vertical temperature gradients encountered with prior art designs.

If desired, electrically energizable heating means may be embedded in the channel structure adjacent the side edges of the channel as indicated generally at 28 in FIGS. 3 and 4 in order to give a greater degree of control over these transverse and vertical temperature gradients. With elements so located, it will be apparent that they can be operated so as to complement the central cooling of the molten glass described herein above.

Burner blocks 30, 30 are provided on the tops of the channel sides, as best shown in FIGS. 2 and 3, for receiving a plurality of conventional gas burners 32, 32. The burners fire laterally into the space between the surface of the molten glass and the ceiling of the roof structure of the forehearth, to be described. Longitudinally extending gas manifolds 34, 34 are provided along either side of the forehearth for feeding the gas or other fuel to the burners 32, 32.

In further accordance with the present invention, each forehearth section is provided with a roof structure which includes a center arch, or keystone portion, and adjacent side portions supported on the burner blocks 30, 30. The center arch portion and associated side portions cooperate with one another to define a ceiling for the channel in which the molten glass is adapted to flow. The side portions of the roof structure comprise refractory side blocks 36, 36 one of which is shown in perspective in FIG. 5, which blocks 36, 36 cooperate with one another to support center arch blocks 38, 38 as shown in FIG. 7. The side blocks 36, 36 are supported on the burner blocks 30, 30 and also are supported by suitable iron work 40, 40 which may be of conventional construction, and which includes upright posts 42, 42 for supporting plenum chambers 44, 44 as shown in FIG. 2.

Each of the center arch blocks 38, 38 comprises an upwardly open cast refractory element having a front and a rear wall, 46 and 48 respectively, for abutting the corresponding walls of an adjacent block. Each such center arch block 38 defines an individual chamber through which cooling air can be circulated for lowering the temperature of an associated portion of the ceiling defined by its lower surface, for in turn lowering the temperature of the molten glass therebelow by radiation to the roof structure thereabove. Means, to be described, is provided for circulating air through each of the chambers defined by each of the center arch blocks 38 to reduce the temperature of the center arch portion of the roof structure and thereby reduce the temperature gradient molten glass across the forehearth channel. Still with reference to FIG. 7, the center arch block 38 can also be seen to have upwardly and outwardly inclined sidewalls 50 and 52 for engaging complementary surfaces provided for this purpose on the side blocks 36, 36. Each side block 36 is also cast of a refractory material, and has an inclined inner face 54 for receiving the inclined face of an associated center block 38, and these complementary surfaces can be seen to define openings for exhausting the cooling air from each associated chamber. Still with reference to FIG. 7, the lower wall of each chamber is provided with laterally extending ribs 56, 56 for improving the heat transfer between the cooling fluid and the ceiling defining portion of the roof structure. A flow splitting, or divider wall 58, is also provided in the lower wall of the chamber for splitting or dividing the cooling fluid into two laterally outwardly directed streams extending generally toward the inclined side walls of the arch block as indicated by the arrows in FIG. 3. From this view it will be apparent that the cooling air if exhausted through openings, or notches, provided in the side walls of the side blocks, and thence outwardly through pasageways in chimney or flue blocks to be described.

Still with reference to FIG. 3, each of the individual chambers associated with the center arch blocks 38, 38 is provided with a cap 62 also cast of refractory material and best shown in FIG. 6. The cap 62 has a central opening 64 through which the cooling fluid is introduced into each of the chambers, and depending guide walls 66, 66 are integrally cast into the cap 62 for expanding the air flow in this area to achieve a maximum temperature differential between the cooling air and the arch block as the air impinges upon the lower wall of the arch block 38. Each of the blocks 38, 38, and hence each of the individual chambers has a supply pipe 68 associated therewith for connecting that chamber with the plenum chamber 44, and each pipe 68 may include an orifice plate 65 to assure that the air flow to each of the chambers associated with each arch block 38 is maintained at a uniform rate.

From FIG. 3 then it will be apparent that the downwardly moving cooling air enters the chamber, defined by the center arch block 38 and its associated cap 62, from above having a maximum effect on the center portion of such block, and that the cooling air is exhausted through notches or openings associated with the upper side edges of the block 38 for exhausting through the passageways in the side blocks 36, 36 and thence through chimney blocks 60, 60. Thus, the cooling air passage is well insulated above that portion of the molten glass near the channel sides to prevent heat extraction in this area by the side blocks 36, 36. Insulation 78, 78 further reduces heat extraction in this area.

Each of the side blocks 36, 36 has an inclined inner face 54 for engaging and supporting an associated keystone or arch block 38 as mentioned above and in addition defines a cavity 63 for defining a portion of the passageway for the cooling air circulated through the individual roof chambers. The front and rear face of the side block 36 also define passageways 70, 70 to carry off the products of combustion introduced by the burners 32, 32 independently of the cooling air passageway 63. The lower surface of each of the side blocks 36, 36 has an inner portion which cooperates with the lower surface of the center arch block 38 to define the ceiling for the molten glass channel. Referring more particularly to FIG. 3, each of the side blocks 36, 36 has a ceiling defining portion which includes a downwardly and inwardly inclined surface 72, 72 adjacent the burners and an upwardly extending surface 74, 74 adjacent the inclined surface 54 thereof which receives the center arch block 38. As so designed, the side blocks 36, 36 cooperate with one another to provide longitudinally extending lips which do not appreciably affect the flames from the burners when they are operated at high energy levels but which impede the flames so produced and direct the same downwardly toward the glass adjacent the sides of the channel when the burners are operated at relatively low energy levels. As best shown in FIG. 4, the flues 70, 70 defined by these side blocks 36, 36 open inwardly at the upwardly extending ceiling defining portion thereof, and when the burners 32, 32 are operated at high energy levels, as mentioned above, these flues tend to exhaust the products of combustion from those burners in the opposite side wall of the forehearth. However, when the burners are operated at low energy levels the products of combustion are exhausted through those flues associated with the same wall and tend to follow the edge of the lip defining portion of the blocks 36, 36. From the above-stated objects of the present invention, namely to achieve a minimum temperature gradient across the forehearth channel, the advantages to this phenomena will be readily apparent. That is, the burners can be operated at high energy levels to bring the molten glass in the channel up to a desired operating temperature, after which the burners can be throttled back to merely take care of whatever heat losses are present. The novel roof structure just described achieves this without the usual tendency for these burners to overheat the glass in the center portion of the channel. Also, as a result of the lip geometry shown, it will be apparent that even at low burner energy levels the lip defining portion of the forehearth ceiling will be at a high temperature and will therefore radiate heat directly to the adjacent glass along the marginal side edges of the channel.

Finally, the chimney blocks 60, 60 also have front and rear walls which are notched to form a continuation of the exhaust gas passageways 70, 70 in the side blocks 36, 36 to carry off the products of combustion independently of the cooling air which passes upwardly through a central opening in these chimney blocks as mentioned previously. Baffle, or cap blocks 76, 76 are provided above these respective passageways and openings so that both the exhaust gasses and the spent cooling air can be mixed for tempering the effect of the exhaust gasses on the surrounding atmosphere.

We claim:

1. A molten glass forehearth comprising an elongated channel with sides for constraining the flow of molten glass in a downstream direction, a roof structure for said channel and including side portions and a center arch portion supported thereby, burner means between said channel sides and said roof structure for firing laterally into the space between the glass melt surface and the underside of the roof structure said roof structure side portions defining flues for exhausting the products of combustion introduced by the burner means in the opposite side of the forehearth, said roof structure center arch portion comprising a plurality of upwardly open refractory blocks each of which has a front and a rear wall for abutting the wall of an adjacent block and upwardly and outwardly inclined side walls for engaging complementary surfaces in the side portions of said roof structure, caps for each of said upwardly open blocks to define a plurality of laterally extending longitudinally spaced chambers, each cap having a central opening through which cooling air can be introduced to the chamber, flow splitting means in said blocks for directing the air laterally outwardly toward said inclined side walls, and exit passageways defined in said side portions of said roof along side and separate from said flues for the exhaust gasses, said exit passageways being located farther from the glass melt surface than said chamber so that the glass is cooled beneath the center arch portion of the roof structure to a greater extent than at the side portions thereof.

2. The combinaion defined in claim 1 wherein said side portions of said roof structure comprise a plurality of refractory blocks having inclined inner surfaces for engaging and supporting the inclined side walls of said upwardly open blocks in arch fashion, said side blocks also defining said flues and said exit passageways separate from said flues for exhausting said cooling fluid from said arch block chambers.

3. The combination defined in claim 2 wherein each of said side blocks in said roof structure has a ceiling defining portion which includes a downwardly and inwardly inclined surface adjacent said burner means and an upwardly extending surface adjacent said inclined surface to provide longitudinally extending lips adjacent the marginal side edges of the molten glass for radiating heat to the glass in this area.

4. The combination defined in claim 3 wherein said flues for exhausting the products of combustion introduced by said burner means are defined in said side blocks as aforesaid, and wherein said flues more particularly open inwardly adjacent the junction between said upwardly extending ceiling surface of said side blocks and said ceiling defining portion of said arch blocks whereby said flues receive exhaust gasses from burner means in the opposite side of the forehearth when said burner means are operated at high energy levels and from burner means in the same side of the forehearth when operated at low energy levels.

5. The combination defined in claim 4 wherein said roof structure further includes flue blocks above said side blocks for exhausting the gases from said flues and for carrying off the spent cooling fluid, said fluid circulating means comprising means for continuously circulating air through said individual chambers in the center portion of said roof structure.

6. The combination defined in claim 1 further characterized by a longitudinally extending centrally arranged cooling passageways in said channel structure, means for introducing cooling air adjacent the upstream end of the forehearth to cool the glass from below to permit control of the temperature of the bottom layer of glass independently of the top layer, said top layer being cooled as aforesaid by said longitudinally spaced chambers in said roof structure.

7. The combination defined in claim 6 further characterized by electrically energizable heating elements embedded in the side portions of the channel structure, and means for automatically regulating the flow of cooling air through the passageway in said channel structure in response to variations in the temperature of said bottom layer of glass.

References Cited

UNITED STATES PATENTS

| | | | |
|---|---|---|---|
| 1,557,148 | 10/1925 | Ferngren | 65—337X |
| 2,616,380 | 11/1952 | Griffen | 65—346X |
| 3,266,789 | 8/1966 | Henry et al. | 65—355X |
| 3,388,204 | 6/1968 | Ellis et al. | 65—337UX |
| 3,437,327 | 4/1969 | Day et al. | 65—337X |

S. LEON BASHORE, Primary Examiner

S. R. FRIEDMAN, Assistant Examiner

U.S. Cl. X.R.

65—347, 355